United States Patent [19]

Chang

[11] Patent Number: 5,204,040

[45] Date of Patent: Apr. 20, 1993

[54] METHOD OF MAKING FOAM MATERIAL

[76] Inventor: Kun-Huang Chang, No. 10-3, Changshu, Changshu Village, Tanglo Shiang, Miao Li Hsien, Taiwan

[21] Appl. No.: 834,951

[22] Filed: Feb. 14, 1992

[51] Int. Cl.$^5$ ............................................ B29C 67/22
[52] U.S. Cl. ...................................... 264/51; 264/109; 264/321; 264/DIG. 7; 264/DIG. 69
[58] Field of Search ............... 264/45.3, 46.3, 109, 264/321, 46.2, 51, DIG. 7, DIG. 69

[56] References Cited

U.S. PATENT DOCUMENTS

| | | | |
|---|---|---|---|
| 3,452,122 | 6/1969 | Stern et al. | 264/51 |
| 3,590,425 | 7/1971 | Lieberman | 264/46.3 |
| 3,686,047 | 8/1972 | Miller | 264/46.3 |
| 4,242,306 | 12/1980 | Kreuer et al. | 264/45.3 |
| 4,278,482 | 7/1981 | Poteet et al. | 264/321 |
| 4,666,646 | 5/1987 | Chang | 264/109 |

Primary Examiner—Allan R. Kuhns
Attorney, Agent, or Firm—Browdy and Neimark

[57] ABSTRACT

A method of making foam material includes a process of impregnating comminuted particles of a previously formed foam material with a first foaming reaction solution made up of polyol, catalyst and additives and with a second foaming reaction solution containing diisocyanate. The comminuted particles are also subjected to a rolling pressure when they are being impregnated with the first foaming reaction solution. The impregnated particles are transferred to a forming area provided with steam serving to accelerate the foaming reaction of the impregnated particles. The foam material so produced is provided with excellent properties.

2 Claims, 1 Drawing Sheet

METHOD OF MAKING FOAM MATERIAL

BACKGROUND OF THE INVENTION

The present invention relates to a method of making foam material, and more particularly to a method of making useful foam material from waste foam material.

A U.S. patent bearing U.S. Pat. No. 3,452,122 discloses a method of making foam material by bonding together the particles of comminuted previously formed foam material and a foamable polyurethane resin composition. The foam material made by means of such method as mentioned above is provided with superior qualities of high density and high air permeability by virtue of the facts that the cavities of particles of comminuted foam material are filled with the new foam material and that the new foam material penetrates into the particles of comminuted foam material. However, the foam material made by the disclosed method mentioned above is defective in that it is not provided with a quality of strong tensile strength. According to the applicant of this patent application, the foamable polyurethane resin composition was found to be incapable of penetrating completely into the particles of comminuted foam material. Therefore, an improved method intended to provide a solution to the problem described above was disclosed by this applicant in a U.S. patent bearing U.S. Pat. No. 4,666,646. The method is characterized in that the particles of comminuted previously formed foam material are dried before they are mixed with the foamable polyurethane resin composition. As a result, the foam material so produced is found to have a greater tensile strength as compared with the foam material made by the other disclosed method mentioned above. This is due to the fact that the dried particles permit a relatively greater quantity of foamable polyurethane resin composition to penetrate thereinto. This improved method is by no means satisfactory. In addition, such improved method is a time-consuming process.

SUMMARY OF THE INVENTION

It is therefore the primary objective of the present invention to provide an improved method of making foam material, which permits the foamable polyurethane resin composition to penetrate effectively and thoroughly into the particles of comminuted previously formed foam material.

It is another objective of the present invention to provide an improved method of making foam material, which accelerates the reaction process of foaming and forming.

In keeping with the principles of the present invention, the foregoing objectives of the present invention are accomplished by a method comprising the steps of:
 (a) comminuting a previously formed foam material;
 (b) drying the particles of comminuted previously formed foam material;
 (c) impregnating the dried particles obtained in step (b) with a first foaming foaming reaction solution made up of polyol, catalyst and additives;
 (d) rolling the treated particles obtained in step (c);
 (e) mixing the rolled particles obtained in step (d) with a second foaming reaction solution containing a predetermined quantity of diisocyanate; and
 (f) introducing the particles obtained in step (e) into a foaming area provided with steam to facilitate the foaming reaction to take place.

The method of the present invention outlined above is characterized in that it comprises processes, which involve the impregnating of particles in the first foaming reaction solution and the rolling of the impregnated particles, enabling the second foaming reaction solution to penetrate thoroughly into the particles. The foam material so produced is provided with excellent physical properties.

The method of the present invention is further characterized in that it consists of processes, which involve the impregnating of particles in the first and the second foaming reaction solutions and the subsequent transfer of the impregnated particlses to the forming area provided with steam to enable the foaming reaction to accelerate.

DETAILED DESCRIPTION OF THE PREFERRED EMBODIMENT

The method embodied in the present invention involves a process by which a previously formed foam material is comminuted into particles having a diameter under 3 mm. Such comminuted particles are then dried in an oven for a predetermined period of time under temperature on the order of 150 degrees in Celsius. The length of time and the degree of temperature required for the drying process are dependent on the quantity of particles intended to be dried.

Figure 1:
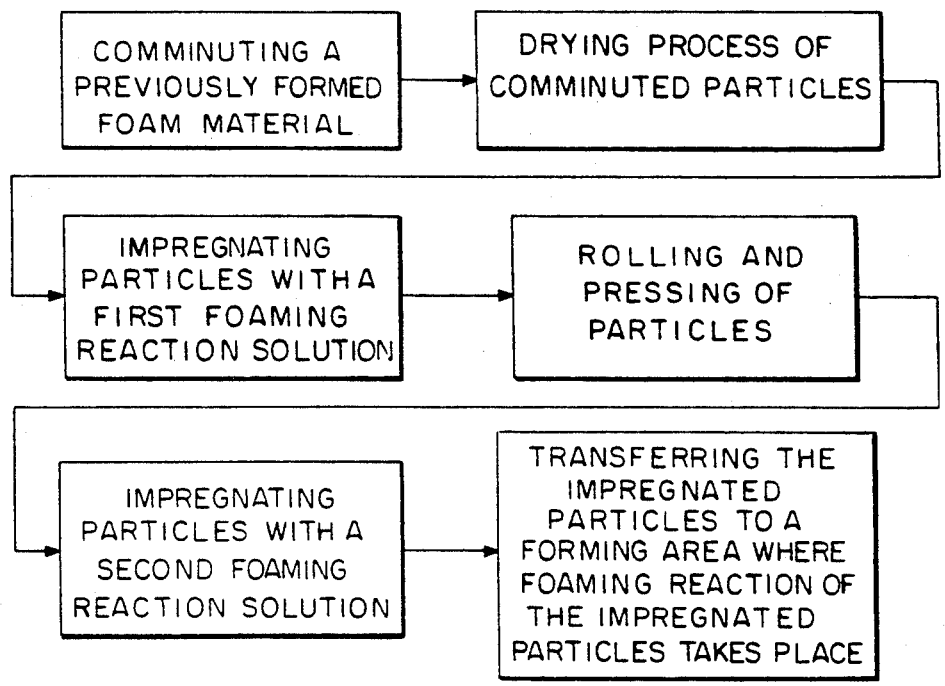
FIG. 1 shows a flow chart of the method embodied in the present invention.
Figure 2:
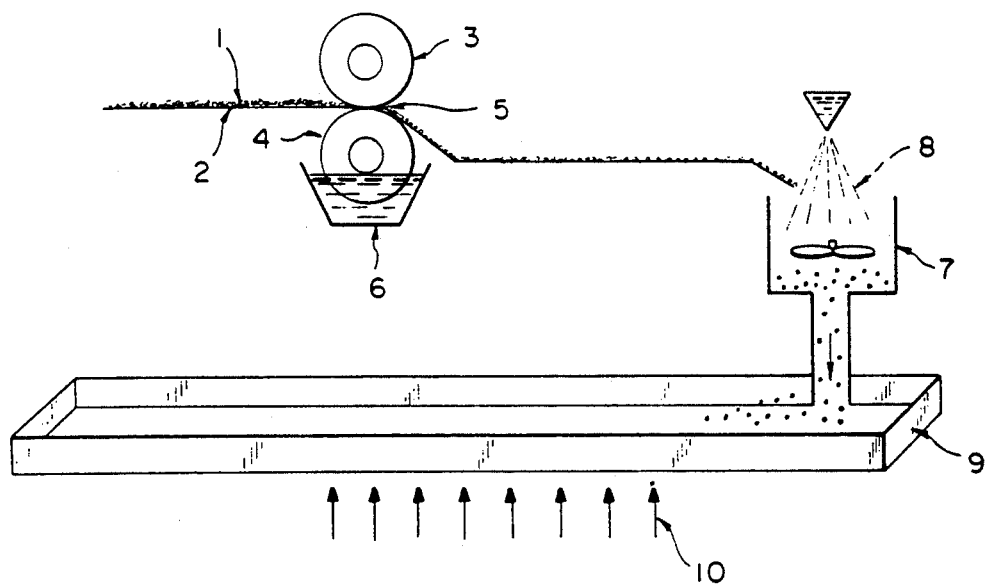
FIG. 2 shows a schematic view of the method embodied in the present invention.

As shown in FIG. 2, the dried particles 1 are transported via a conveyor 2 to a narrow clearance 5 located between the two stacked upper and lower rolling wheels 3 and 4. The lower rolling wheel 4 is partially submerged in a first foaming reaction solution, which is made up of polyol, catalyst and additives in a predetermined ratio and is contained in a solution tank 6. When upper and lower rolling wheels 3 and 4 rotate in relation to each other, the particles 1 located at the narrow clearance 5 are impregnated with the first foaming reaction solution coated on the surface of the lower rolling wheel 4. In the meantime, the particles 1 located at the narrow clearance 5 are subjected to rolling pressures exerting thereon respectively by upper and lower rolling wheels 3 and 4 so as to facilitate the first foaming reaction solution to penetrate effectively into the pressed particles 1.

The impregnated particles 1 described above are subsequently introduced into a mixer 7 along with a second foaming reaction solution 8 made up of TDI (tolylene diisocyanate) and 60% of polyol by weight.

The particles 1 impregnated with the first and the second foaming reaction solutions are finally transferred to a foaming tank 9 provided at the bottom thereof with a steam-generating device. The steam 10 so generated in the forming tank 9 is used to accelerate the foaming reaction of the impregnated particles 1.

It is apparent that the particles 1 have been impregnated thoroughly with the first foaming reaction solution before they are subjected to impregnation with the second foaming reaction solution. As a result, the newly-formed foam material is provided with relatively better tensile strength, air permeability and other properties.

What is claimed is:

1. A method of making foam material comprising steps of:
   (a) comminuting a previously formed foam material into particles;
   (b) drying said particles to obtain dried particles;
   (c) impregnating said dried particles with a first foaming reaction solution made up of polyol, catalyst and additives so as to obtain first impregnated particles and at the same time rolling and pressing said first impregnated particles so as to obtain rolled particles;
   (d) mixing said rolled particles with a second foaming reaction solution containing a predetermined quantity of diisocyanate so as to obtain second impregnated particles; and
   (e) transferring said second impregnated particles to a forming area provided with steam and using steam to facilitate foaming of said second impregnated particles.

2. A method of making foam material according to claim 1 wherein said dried particles are impregnated with said first foaming reaction solution coated on one of two rolling wheels stacked in such a manner that there is a clearance located therebetween.

* * * * *